United States Patent [19]

Keenan

[11] Patent Number: 5,012,945
[45] Date of Patent: May 7, 1991

[54] RUPTURE DISK ASSEMBLY

[75] Inventor: Gordon A. Keenan, Baton Rouge, La.

[73] Assignee: Exxon Research and Engineering Co.

[21] Appl. No.: 450,967

[22] Filed: Dec. 15, 1989

[51] Int. Cl.$^5$ .................... F16K 17/164; B65D 51/16
[52] U.S. Cl. .................................. 220/89.1; 220/207; 220/208; 137/68.1; 137/71
[58] Field of Search ..................... 220/89 A, 207, 208; 137/68.1, 70, 71

[56] References Cited

U.S. PATENT DOCUMENTS

| | | |
|---|---|---|
| 2,514,823 | 7/1950 | Yost . |
| 2,641,202 | 6/1953 | Talmey ............................. 220/207 |
| 2,905,358 | 9/1959 | Herbage ............................ 137/70 |
| 2,952,383 | 9/1960 | Paxton ............................ 220/89 A |
| 3,310,197 | 3/1967 | Folmsbee ........................ 220/89 A |
| 3,598,277 | 8/1971 | Adelman ......................... 220/89 A |
| 3,788,514 | 1/1974 | Giacoma ......................... 220/89 A |
| 3,964,508 | 6/1976 | Miller . |
| 4,102,469 | 7/1978 | Shegrud et al. . |
| 4,245,566 | 1/1981 | Shimansky ...................... 220/89 A |
| 4,245,749 | 1/1981 | Graves ............................ 137/68.1 |
| 4,315,575 | 2/1982 | Schwarz et al. . |
| 4,388,940 | 6/1983 | Powell ............................ 220/89 A |
| 4,793,509 | 12/1988 | Coleman . |
| 4,796,704 | 1/1989 | Forrest ............................. 137/70 |

OTHER PUBLICATIONS

U.S. Coast Guard Drawing (by Appl. Admission 1 yr. Prior to Filing).

Primary Examiner—Stephen Marcus
Assistant Examiner—S. Castellano

[57] ABSTRACT

This invention is concerned with an improved safety rupture disk assembly. This rupture disk assembly, which is designed for a fluid containment vessel, comprises two main parts: a removable rupture disk, and a cover plate. The rupture disk, of course, is designed to rupture, or fail, at a predetermined pressure, and to be easily removed and replaced by another rupture disk in the event of a failure. The cover plate is designed so as to "float" over the rupture disk and automatically seal the opening of the vessel after the pressure within the vessel has been release by disk failure. Additionally, nuts, washers and sealing wires are provided for positively securing the cover plate over the opening resulting from disk failure and for preventing inadvertent securing of the cover plate.

8 Claims, 1 Drawing Sheet

U.S. Patent      May 7, 1991      5,012,945
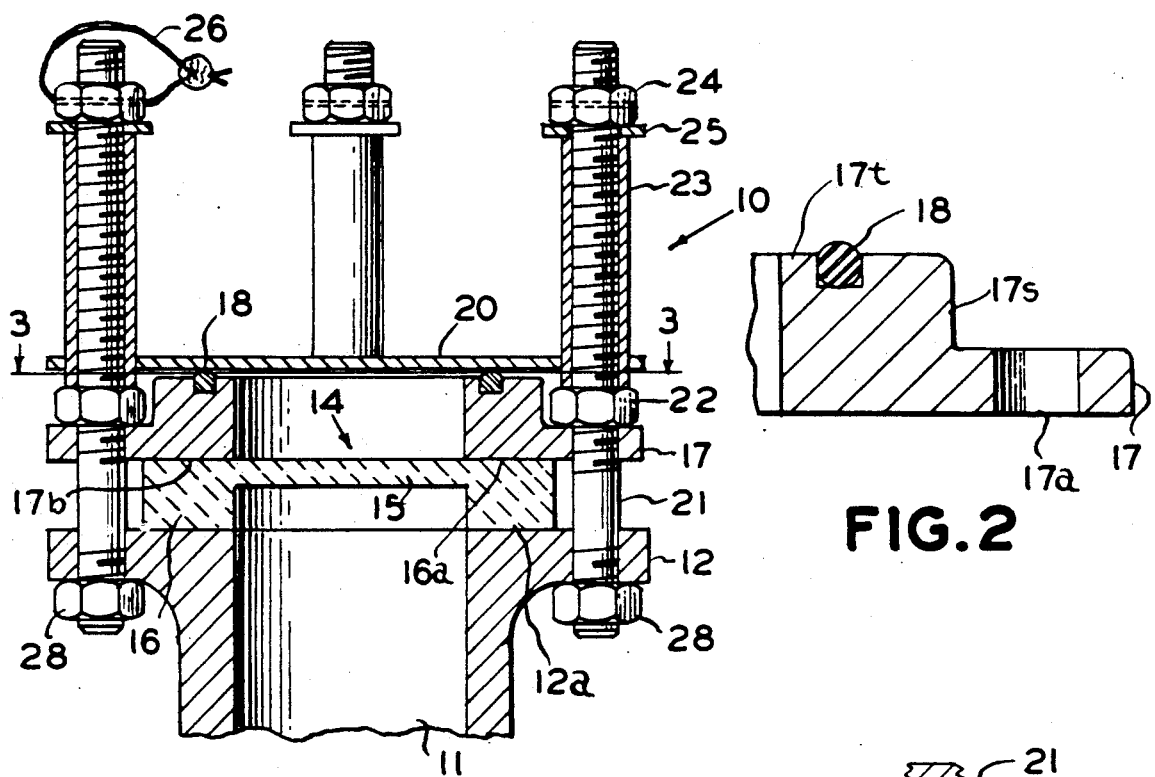
FIG. 1
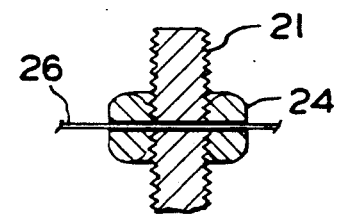
FIG. 2
FIG. 4
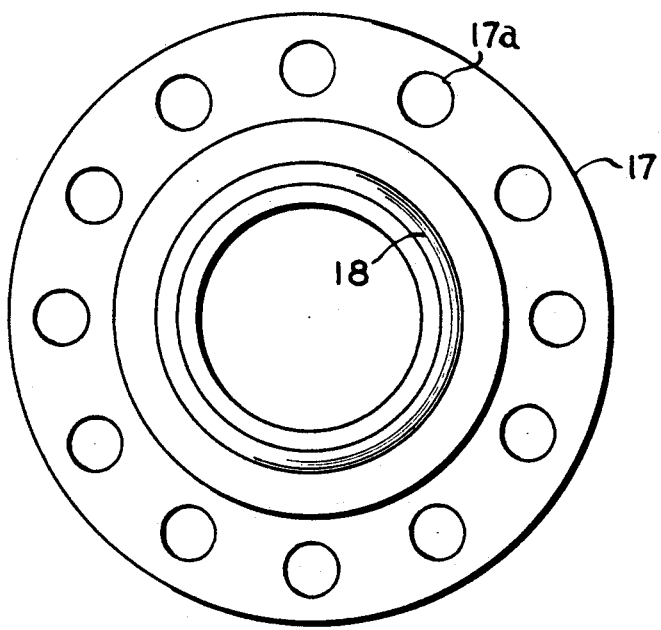
FIG. 3

RUPTURE DISK ASSEMBLY

FIELD OF THE INVENTION

The present invention relates generally to safety pressure relief devices and, more particularly, to improved ruptured disk assembly for use with fluid containment vessels used in closed loading service.

BACKGROUND OF THE INVENTION

Fluid containment vessels generally are fitted with pressure relief devices that will automatically vent the vessel to the atmosphere when a maximum permissible pressure level is reached within the vessel, thus preventing failure of the vessel. For example, barges used for transporting liquids have fluid containment hulls that are not designed to withstand pressures greater than about 3.0 psi. Consequently, it has long been the practice to provide safety vents on the barge, which will automatically open to the atmosphere when pressure of the fluid containment barge vessel reaches a maximum permissible pressure.

An example of one type of pressure relief device used on containment vessels can be found in U.S. Pat. No. 3,310,197. This device consists essentially of a rupture disk which is covered by a non-sealable but pivotably mounted cap to keep dirt and foreign material off the disk. If the disk is ruptured, the tank cannot be positively sealed without replacing the ruptured disk.

In U.S. Pat. No. 3,598,277, there is disclosed a safety relief valve that includes a rupture disk and a closure cap. The closure cap is mounted in such a way that it can move vertically upward, permitting communication of the tank with the atmosphere in the event of the failure of the rupture disk. The cap can move vertically downward so as to close the opening in the tank when the pressure in the tank is reduced to approximately atmospheric pressure. The disadvantage of such a device, however, is that it does not positively seal the tank contents from the atmosphere. Indeed, if the contents of the tank have a relatively high vapor pressure, the vapor would tend to lift the cap.

Other devices that have been employed as safety valves include spring loaded, and weighted covers for the tank openings. In some instances, these devices have also been provided with bolting devices for positively sealing the cover when the containment vessel is loaded. The disadvantage of these types of devices, of course, is that the cover may inadvertently be secured prior to filling of the container, thereby preventing the assembly from relieving pressure, if necessary, with the result that the safety feature of the assembly is lost.

Accordingly, there remains a need for an improved rupture disk assembly that will prevent excessive pressure from developing in liquid containment vessels, especially during closed loading service, which will possess self-closing ability after rupture, thereby automatically sealing the tank contents from the atmosphere. Finally, also, there is a need for a rupture disk assembly that can be positively sealed but which will not readily lend itself to being inadvertently secured.

SUMMARY OF THE INVENTION

Accordingly this invention is concerned with an improved safety rupture disk assembly. This rupture disk assembly, which is designed for a fluid containment vessel, comprises two main parts: a removable rupture disk, and a cover plate. The rupture disk, of course, is designed to rupture, or fail, at a predetermined pressure, and to be easily removed and replaced by another rupture disk in the event of a failure. The cover plate is designed so as to "float" over the rupture disk and automatically seal the opening of the vessel after the pressure within the vessel has been released by disk failure. Additionally, means are provided for positively securing the cover plate over the opening resulting from disk failure and for preventing inadvertent securing of the cover plate.

These and other features of the invention will be best understood from the detailed description which follows when read in conjunction with the accompanying drawings.

BRIEF DESCRIPTION OF THE DRAWINGS

FIG. 1 is a vertical cross-sectional view of a rupture disk assembly according to the present invention.

FIG. 2 is a fragmentary cross-sectional view showing the shoulder of the top flange illustrated in FIG. 1.

FIG. 3 is a plan view, taken along lines 3—3 of FIG. 1, of the top flange of the assembly of FIG. 1 showing the bolt apertures in the top flange.

FIG. 4 is a detailed illustration of the sealing wire aperture in the bolt and nut shown in FIG. 1.

DETAILED DESCRIPTION OF THE INVENTION

Referring to FIG. 1, the rupture disk assembly 10 is shown mounted on a tubular tank vent 11 of a fluid containment vessel (not shown). Vent 11, as shown, has a mounting flange 12. The rupture disk assembly 10 includes a rupture disk 14 having a central portion 15 with a diameter sufficient to cover the opening in vent 11 and an annular ring portion 16 that bears on the top, flat, annular sealing face 12a of mounting flange 12.

The rupture disk 14 can be fabricated from any of a number of well known materials. The disk 14, of course, is made to rupture at a predetermined pressure. In general, the material used for the construction of the rupture disk 14 will be a material which is inert to the fluid to be contained in the fluid vessel. In the practice of the present invention, it is particularly preferred that the rupture disk be made from carbon, graphite or other inert and high temperature resistant material that can be formed, for example, by compression molding or the like. This type of rupture disk is commercially available.

Optionally, the rupture disk can be coated with chemical inert films and the like.

The rupture disk assembly 10 of the present invention also includes an annular top flange 17 having a bottom face 17b which bears on the top surface 16a of disk 14. Top flange 17 includes a plurality of apertures 17a which are spaced so as to align with corresponding apertures in mounting flange 12. In the practice of the present invention, it is preferred that there be at least four, and more preferably at least 12, apertures equally spaced around the periphery of annular top flange 17, as well as corresponding apertures equally spaced along the mounting flange 12.

As can be seen particularly in FIG. 2, the top flange 17 has a shoulder portion 17s having a top surface 17t. It is particularly preferred in the practice of the present invention that the top surface 17t is machined with a groove parallel to that face to accommodate a portion of an O-ring 18. The O-ring, of course, serves as a sealing gasket and may be fabricated from any resilient material, such as rubbers, elastomers and the like. Alternatively, other flexible gasketing means may be interposed between the cover plate 20 and the top surface 17t of flange 17.

As can be seen in FIG. 1, a floating cover plate 20 is horizontally disposed over annular top flange 17. The cover plate 20 is provided with a plurality of apertures, preferably four, equally spaced in an annular ring so that they will align with corresponding apertures in the top flange 17 and the mounting flange 12.

A plurality of stud bolts 21, equal in number to the apertures in cover plate 20, are provided, which have bodies sized to extend through the apertures in the mounting flange 12, the top flange 17 and cover plate 20 when the ruptured disk 14 is in position in the assembly 10. Stud bolts 21 have a length that is sufficient to act as vertical guides for floating cover plate 20. In general, the length of the stud bolts will be about 2 to 3 times the distance from the bottom of mounting flange 12 to the top of cover plate 20 when disk 14 is in position in the assembly 10 and preferably in the range of about 2.3 to about 2.5 times that distance.

A plurality of first nuts 22 are positioned on stud bolts 21 below the cover plate 20 and above top flange 17 and a plurality of second nuts 28 are positioned on stud bolts 21 below mounting flange 12, so that when the first nuts 22 are tightened, they urge the top flange 17 downwardly onto the top surface 16a of the annular ring position 16 of ruptured disk 14. Optionally, other fastening and guiding means can be employed, such as elongated bolts having a fixed head at one end obviating the necessity for second nuts 28.

A riding sleeve 23 is positioned on each of the stud bolts 21 above the nuts 22, so that cover plate 20 is capable of moving upwardly and downwardly in a vertical direction without being encumbered in any way by the threads on the bolts 21.

A second set of nuts 24 are positioned on the distal end of bolts 21 so as to maintain the riding sleeve 23 in position and prevent vertical movement of sleeves 23. Optionally and preferably, a plurality of washers 25 are interposed between top of the riding sleeves 23 and the second set of nuts 24.

In the event the mounting flange 12 and top flange 17 are provided with more than four apertures, for example 12 apertures as shown in FIG. 3, additional bolts may be provided for tightening the top flange 17 onto the mounting flange 12. These bolts, of course, will not extend upward above the top surface 17t of flange 17 and preferably will be of a length that the top of these bolts will be sufficiently below the top surface 17t of flange 17 so that the bolts will not interfere with cover plate 20 seating on flange 17.

In a particularly preferred embodiment of the present invention, at least one of the stud bolts 21 has an aperture at the distal end of sufficient size to accommodate a sealing wire. Additionally, a nut 24 placed on that stud bolt 21 has an aperture through which, when in alignment with the aperture in bolt 12, will permit a sealing wire 26 to extend through the nut and bolt.

When the rupture disk assembly is arranged and installed as shown in FIG. 1, for example on a fluid cargo tank of an inland water barge, the tank can be filled without the fluid being exposed to the atmosphere. In the event, however, that the tank becomes overpressurized, for example by overfilling or the like, the disk 14 will rupture, thereby relieving the pressure within the tank thereby preventing a catastrophic failure of the barge with the possible loss of the entire tank contents into the surrounding environment. After the disk 14 ruptures, cover 20 will float upwardly guided by the stud bolts 21 covered with the riding sleeves 23. As soon as the reason for overpressurization of the tank is corrected, the cover 20 will move vertically downward and sit on the O-ring 18 thereby positively sealing the contents of the tank from the atmosphere. Additionally, before getting underway, the sleeves 23 can be removed and the nuts 24 urged downwardly, thereby securing the cover 20 in place during shipment of the cargo.

By equipping the rupture disk assembly 10 with a sealing wire 26, that wire must be broken in order to secure cover plate 20 in position, thereby avoiding inadvertent securing of the cover plate 20, which would, of course, negate the safety feature of the rupture disk 14.

As will be readily apparent, the rupture disk assembly 10 of the present invention also permits a ruptured disk 14 to be readily changed in a matter of minutes by the operator. Thus, the rupture disk assembly of the present invention has numerous advantages, among which are the fact that it provides protection against overpressurization of fluid containment tank. It has a self-closing ability because the cover plate will automatically seal the tank from the atmosphere after the ruptured disk has been ruptured and the pressure has been released from the tank. It has a significant safety feature in that the cover plate cannot be inadvertently secured, thereby overriding the effectiveness of the rupture disk. Additionally the assembly is readily disassembled and repaired. These and other significant advantages of the device of the present invention should be readily apparent to those with skill in the art to which this subject matter pertains.

Also, it should be understood that while certain forms of this invention have been illustrated and described, it is not to be limited thereto, except insofar as such limitations are included in the following claims.

What is claimed is:

1. A rupture disk assembly for mounting on a tubular vent of a fluid containment vessel comprising:
   a replaceable rupture disk for horizontal mounting over the tubular vent;
   a top flange means positioned over the rupture disk;
   securing means for urging the top flange downwardly and securing the rupture disk over the tubular vent thereby sealing the fluid in the vessel from the atmosphere;
   a vertically moveable cover plate horizontally disposed over and resting on the top flange;
   means for guiding the vertical movement of the cover plate whereby the cover plate will move vertically upward upon failure of the rupture disk caused by an increase in pressure in the fluid containment vessel above a predetermined pressure, thereby relieving the increased pressure and the cover plate will move vertically downward and seal the vent when the pressure is relieved;
   means for securing the cover plate over the top flange after a failure of the rupture disk; and,
   a sealing wire operatively connected to the means for securing the cover plate whereby the sealing wire must be broken before the cover plate can be secured over the top flange by the means for securing the plate thereby preventing inadvertent securing of the cover plate.

2. The assembly of claim 1 including a flexible sealing gasket means interposed between the cover plate and the top flange.

3. The assembly of claim 2 wherein the top flange has a top surface and an annular groove in the top surface and wherein the flexible gasket means is an O-ring positioned in the groove.

4. The assembly of claim 1 wherein the means for urging the top flange downwardly on the rupture disk is a plurality of nuts and bolts wherein the top flange has a plurality of apertures therein and the bolts extend vertically through the apertures for a sufficient distance to serve as the means for guiding the vertical movement of the cover plate.

5. The assembly of claim 4 wherein the cover plate has a plurality of apertures therein which are aligned with the apertures in the top flange to permit the bolts that extend vertically through the apertures in the top flange to pass through the apertures in the cover plate wherein the bolts guide the vertical movement of the cover plate.

6. The assembly of claim 5 wherein the bolts are provided with riding sleeves on the portion of the bolts above the top flange whereby the cover plate can move vertically without being hindered by bolt threads.

7. A rupture disk assembly for mounting on a tubular vent of a fluid containment vessel comprising:
- a bottom flange for mounting on the tubular vent of the containment vessel, the flange having an inner annular top sealing surface and an outer annular part having a plurality of evenly spaced apertures therethrough;
- a replaceable rupture disk having a central portion capable of rupturing at a predetermined pressure and an annular ring portion having a top surface and a bottom surface, the annular ring sized so that its bottom surface bears on the top sealing surface of the bottom flange;
- a top flange having an inner annular ring portion having a top and a bottom surface, the inner ring portion sized to bear on the top surface of the annular ring portion of the rupture disk, the top flange having an outer annular ring portion with apertures therein spaced to be in alignment with the apertures in the bottom flange;
- a plurality of bolts extending upwardly through the top and bottom flange for a distance substantially greater than the vertical height of the bottom flange, rupture disk and top flange;
- a plurality of nuts on the blots for urging the top flange downwardly on the annular ring portion of the rupture disk whereby the rupture disk is mounted over the tubular vent of the containment vessel;
- a vertically moveable cover plate horizontally disposed over the top flange, the cover plate having a plurality of apertures therein spaced to align with the apertures in the top and bottom flanges;
- annular gasket means interposed between the cover plate and the top surface of the inner annular ring portion of the top flange;
- a plurality of second nuts mounted on the end of the bolts for securing the cover plate onto the top flange whereby the cover plate can move vertically upward upon a failure of the rupture disk resulting from excessive pressure in the fluid containment vessel and then vertically downward to seal the vessel upon release of the excessive pressure and whereby the plurality of second nuts can be moved downward on the bolts to secure the cover; and,
- a sealing wire operatively connected to the means for securing the cover plate whereby the sealing wire must be broken before the cover plate can be secured over the top flange by the means for securing the plate thereby preventing inadvertent securing of the cover plate.

8. The assembly of claim 7 wherein the top surface of the inner annular ring portion of the top flange includes an annular groove and wherein the gasket means is an O-ring adapted to fit in the annular groove.

* * * * *